United States Patent

[11] 3,543,664

| [72] | Inventors | Rudolf Kremp, Grunwald, near Munich, Ernst Friedlaender, Leverkusen, Alfred Winkler, Munich, Dieter Engelsmann, Unterhaching, near Munich, Heinz Ernst, and Rolf Schroder, Leverkusen, Germany |
|---|---|---|
| [21] | Appl. No. | 728,400 |
| [22] | Filed | May 31, 1968 |
| [45] | Patented | Dec. 1, 1970 |
| [73] | Assignee | AGFA-Gevaert Aktiengesellschaft Leverkusen, Germany |
| [32] | Priority | May 19, 1967 |
| [33] | | Germany |
| [31] | | No. 1,597,052 |

[54] PHOTOGRAPHIC CAMERA WITH EJECTOR FOR FILM MAGAZINES
9 Claims, 8 Drawing Figs.
[52] U.S. Cl...................................................... 95/31; 352/74
[51] Int. Cl......................................................... G03b 19/04, G03b 23/02
[50] Field of Search............................................. 95/31; 352/72, 74, 78

[56] References Cited
UNITED STATES PATENTS

| 2,153,220 | 4/1939 | Wittel................... | 352/74 |
| 2,183,529 | 12/1939 | Fairbanks............. | 352/74 |
| 2,357,076 | 8/1944 | Briskin et al.......... | 352/74 |
| 2,418,331 | 4/1947 | Briskin et al.......... | 352/74 |
| 2,449,626 | 9/1948 | Suthann................ | 352/74 |
| 3,270,645 | 9/1966 | Engelsmann et al... | 95/31 |
| 3,282,185 | 11/1966 | Engelsmann et al... | 94/31 |
| 3,380,362 | 4/1968 | Winkler et al......... | 95/31 |

Primary Examiner—John M. Horan
Assistant Examiner—M. L. Gellner
Attorney—Michael S. Striker ABSTRACT: A camera wherein the chamber for a film magazine accommodates a spring-biased lever which brings about at least partial ejection of the magazine in response to movement of the rear wall of the camera housing to open position. The lever can but need not bear against the magazine when the rear wall is returned to closed position, and it can be returned to a retracted position directly by the rear wall when the latter moves to closed position or by way of the magazine. The lever can be movably mounted in the body or in the rear wall of the housing.

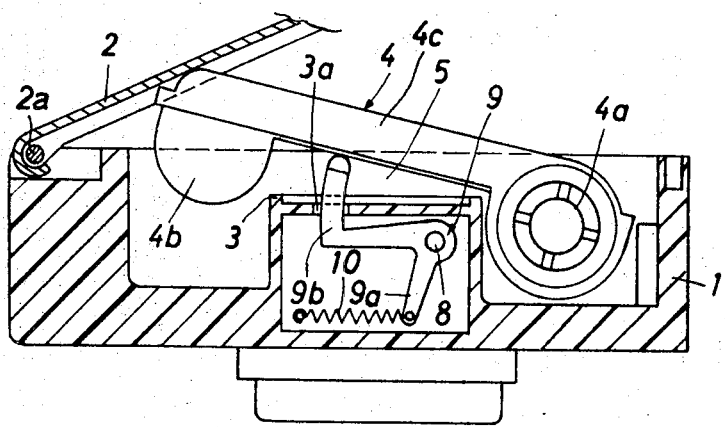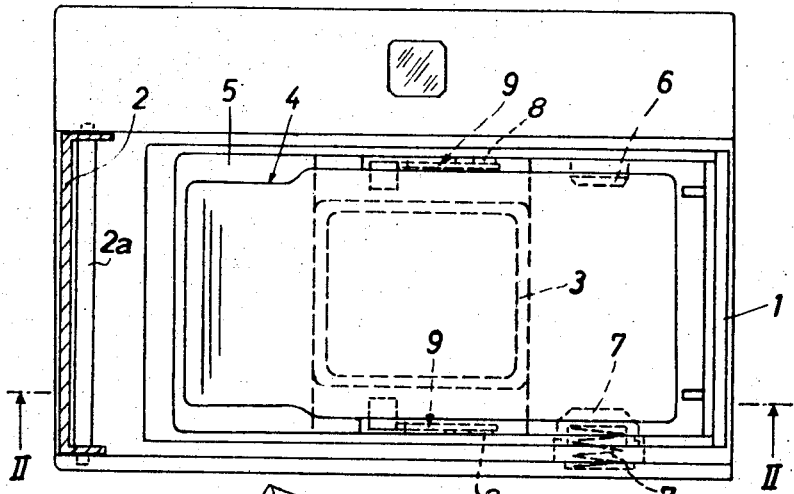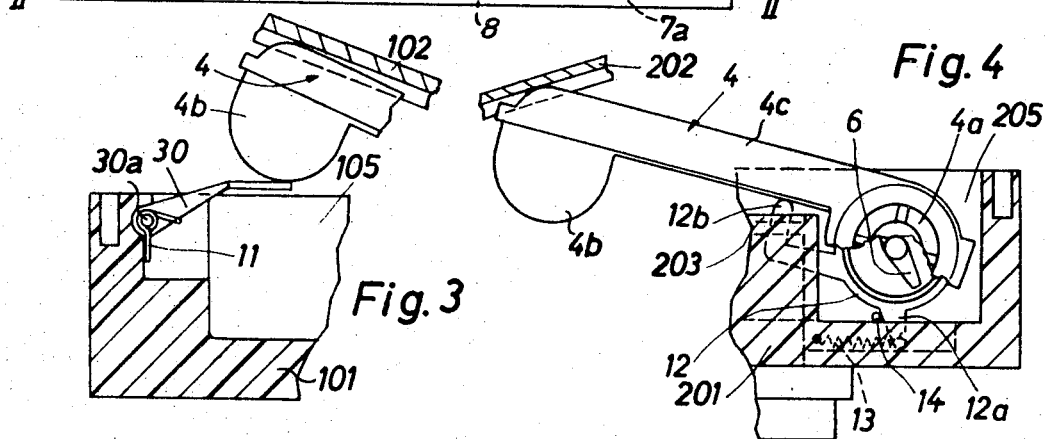

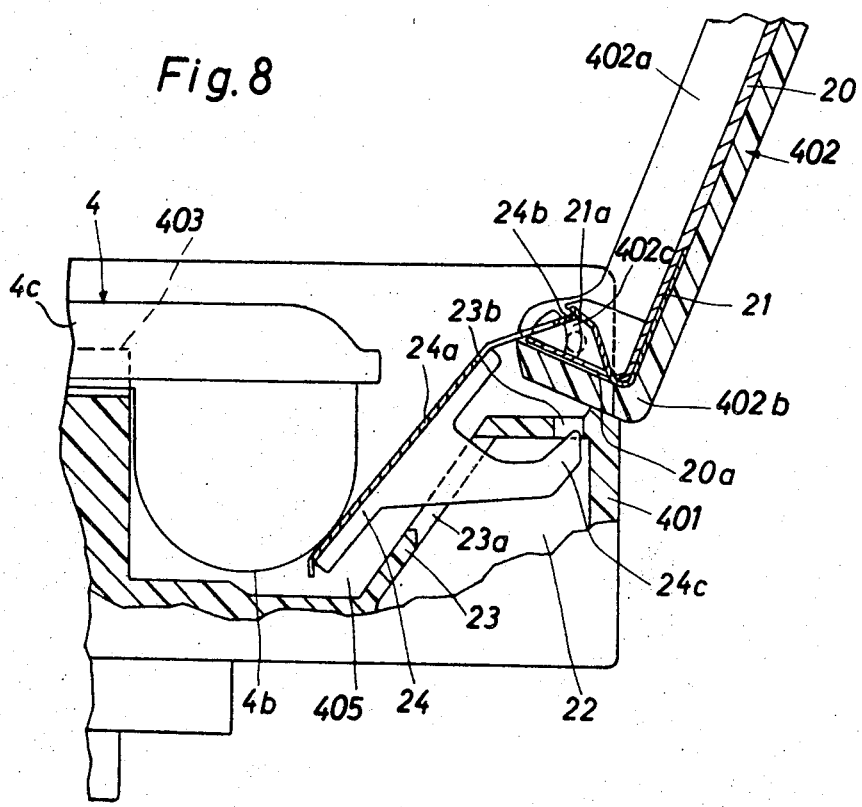
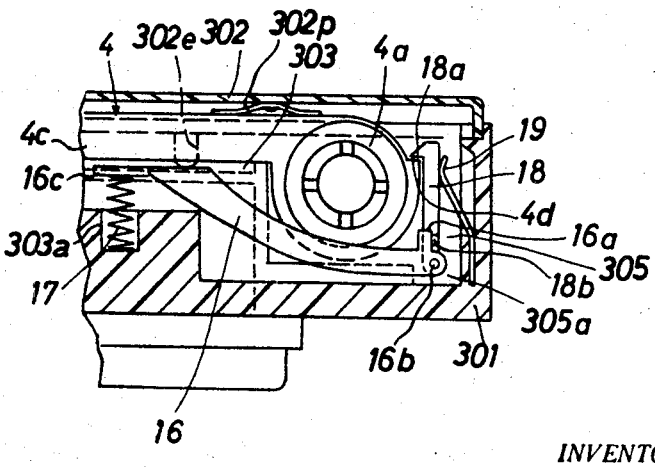

3,543,664

PHOTOGRAPHIC CAMERA WITH EJECTOR FOR FILM MAGAZINES

BACKGROUND OF THE INVENTION

The present invention relates to photographic cameras in general, and more particularly to improvements in motion picture or still cameras which are provided with an ejector capable of effecting at least partial expulsion of one or more film magazines or cartridges from the camera body in response to movement of the cover of the camera housing to open position in which the cover permits withdrawal or insertion of magazines.

It is already known to provide a camera with an ejector for film magazines. The ejector is normally pivoted to a movable cover of the housing or is movable by a cam which is provided on the cover. The arrangement is such that the ejector lifts the magazine out of its chamber in the camera body when the cover is moved to open position so that the magazine can be readily grasped by hand to complete its extraction from the body. A drawback of presently known ejectors is that they do not permit complete insertion of a fresh magazine when the cover is held in open position. If the user attempts to forcibly introduce a fresh magazine into the chamber which is provided therefor in the camera body, the cover, the ejector and/or the means for moving the ejector are likely to be damaged or destroyed.

SUMMARY OF THE INVENTION

It is an object of our invention to provide a still camera or a motion picture camera with a novel ejector which permits full insertion of a fresh magazine or cartridge while the cover of the camera housing remains in open position and wherein such full insertion cannot cause damage, deformation and/or breakage of any parts.

Another object of the invention is to provide an ejector of the just outlined character which is equally useful in cameras having a chamber for a single magazine or several chambers for a corresponding number of discrete magazines.

A further object of the invention is to provide an ejector which is of simple design, which occupies little room in the housing of a camera, which can be manufactured at a low cost, and whose installation in a camera of conventional design involves a minimum of redesigning of the camera housing.

An additional object of the invention is to provide an ejector which can be used in cameras employing conventional magazines or cartridges or specially designed magazines for photographic film.

Still another object of the invention is to provide a camera wherein the ejector occupies space which is normally available in the camera housing so that the mounting of the ejector in the camera does not contribute to the bulk of the housing.

An ancillary object of the invention is to provide an ejector which need not be subjected to any appreciable stresses when the cover is moved to closed position and which does not interfere with proper positioning of a fully inserted magazine or cartridge.

The improved camera comprises a housing having a first portion which defines a chamber for reception of a film magazine and a second portion which may constitute the rear wall of the housing and is movable with reference to the first portion between open and closed positions in which it respectively confines and permits insertion or removal of a magazine from the chamber, and springy ejector means having an element extending into the chamber in the open position of the second housing portion to thus effect at least partial expulsion of the magazine from the chamber in the absence of a force which opposes such partial expulsion of the magazine. Thus, and unless the user applies a pressure which suffices to overcome the springiness of the ejector means, the aforementioned element automatically expels the magazine from the chamber in response to opening of the second portion of the housing, at least to the extent necessary to permit convenient grasping of the magazine by hand to complete its withdrawal from the chamber.

The element of the ejector means may constitute a spring or a rigid or partly rigid member which is biased into the chamber by a spring, at least when the second portion of the housing is held in open position. The rigid member may be a lever which is pivotally or hingedly secured to the first or second portion of the housing and can be moved to a retracted position in response to full insertion of a magazine into the chamber, either by way of the magazine or directly by the second portion of the housing.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a rear elevational view of a still camera which embodies one form of our invention, the cover of the camera being shown in open position and partly broken away;

FIG. 2 is a horizontal sectional view as seen in the direction of arrows from the line II–II of FIG. 1;

FIG. 3 is a fragmentary horizontal sectional view of a modified camera;

FIG. 4 is a fragmentary horizontal sectional view of a third camera;

FIG. 5 is a fragmentary horizontal sectional view of a fourth camera;

FIG. 8 illustrates the structure of FIG. 7, with the ejector in a position it assumes upon insertion of a fresh magazine.

DESCRIPTION OF THE PREFERRED EMBODIMENTS

Figure 6:
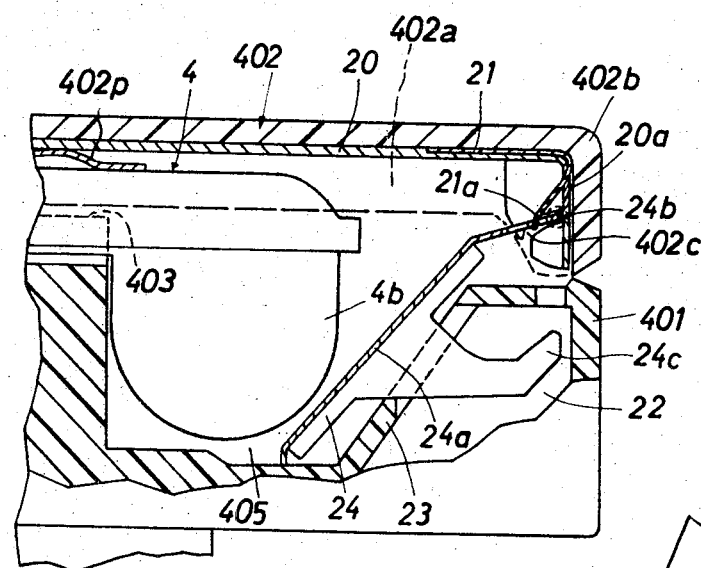
FIG. 6 is a fragmentary horizontal sectional view of a fifth camera with the cover shown in closed position.

FIGS. 1 and 2 illustrate a still camera which comprises a housing including a main portion or body 1 and a second portion 2 which constitutes the rear wall of the housing and is hingedly secured to the body 1 by a pintle 2a. FIG. 2 shows the wall 2 in partly open position in which it permits an ejector to partially expel a magazine 4 from a chamber 5 which is defined by the body 1. The magazine 4 comprises a film storing or supplying section 4b which accommodates a roll of unexposed film when a fresh magazine is inserted into the body 1, a takeup section 4a which accommodates a reel, and a third or intermediate section 4c which connects the sections 4a, 4b and defines a passage for the film so that the film can be withdrawn from the section 4b in response to rotation of the reel in the takeup section 4a by way of a customary film transporting mechanism which is installed in the body 1 but is not shown in the drawing. That frame of film which is located in the intermediate section 4c is adjacent to a window provided in a film platform 3 of the body 1 when the magazine 4 is fully inserted into the chamber 5. A fixedly mounted bearing member 6 is alined with an axially reciprocable bearing member 7 to define an axis of rotation for the reel in the takeup section 4a when the magazine 4 is properly introduced into the chamber 5. The bearing member 7 is biased toward the member 6 by a helical spring 7a.

The purpose of the aforementioned ejector is to automatically pivot the sections 4b, 4c to the positions shown in FIG. 2 as soon as the rear wall 2 of the housing is moved to fully or partly open position. Thus, the ejector can effect partial expulsion of the magazine 4 from the chamber 5 so that the magazine can be properly grasped by fingers to be completely withdrawn from the housing. Such complete withdrawal involves extraction of the reel of the takeup section 4a from the space between the bearing members 6 and 7 by overcoming the bias of the spring 7a.

The ejector comprises two pivot pins 8 which are mounted in the body 1 above and below the platform 3 (see FIG. 1) and each of which supports a rockable ejector element 9 here shown as a two-armed lever. The arms 9a of the levers 9 are biased by springs 10 which tend to turn the respective levers in a clockwise direction, as viewed in FIG. 2, so as to move the arms 9b into the chamber 5, i.e., into that part of the chamber which accommodates the intermediate section 4c of a fully inserted magazine 4. The arms 9b of the levers 9 extend into and are guided by slots or apertures 3a provided in the platform 3. The springs 10 are strong enough to pivot the levers 9 in a sense to turn the magazine 4 about the axis defined by the bearing members 6, 7 and to thereby effect partial expulsion of the sections 4b, 4c from the corresponding parts of the chamber 5 as soon as the lock between the rear wall 2 and body 1 is opened to permit movement of the rear wall to open or partly open position. All the operator has to do is to grasp the section 4c and/or 4b and to extract the reel of the section 4a from the space between the bearing members 6, 7. A fresh magazine 4 is inserted by first introducing its takeup section 4a into the space between the members 6, 7 (i.e., by overcoming the resistance of the spring 7a) and by thereupon pivoting the fresh magazine about the axis of the takeup reel to move it at least to the position shown in FIG. 2. The rear wall 2 is then moved to closed position and completes the introduction of the fresh magazine into the chamber 5. The springs 10 store energy as long as the rear wall 2 remains in closed position because they are caused to expand (through the intermediary of the section 4c and levers 9) when the rear wall moves from open to closed position. It is also possible to effect full introduction of the magazine by finger pressure and to thereupon move the rear wall 2 to closed position. The rear wall then maintains the intermediate section 4c in a predetermined position in which a film frame in the section 4c registers with the window of the platform 3.

It is clear that the ejector of FIGS. 1 and 2 can be modified in a number of ways without departing from the spirit of our invention. For example, one of the levers 9 and the corresponding spring 10 and pivot pin 8 can be dispensed with. The remaining lever 9 can be installed at a level above or below the platform 3. It is also possible to employ more than two levers, for example, to employ two levers at a level above and two levers at a level below the platform 3.

In the camera of FIG. 3, the body 101 of the housing is provided with a chamber 105 for a magazine 4. The rear wall 102 is pivoted to that end of the body 101 which accommodates the takeup section (not shown) of the magazine 4. The ejector comprises a single one-armed lever 30 which is turnable on a pivot pin 30a and is biased by a torsion spring 11 in a sense to bear against the section 4b and to pivot the magazine 4 about the axis of the reel in the takeup section as soon as the rear wall 102 is moved to open position or as soon as the rear wall is free to move to open position. The prongs of the torsion spring 11 operate between the lever 30 and the body 101. This spring is caused to store energy when the section 4b is forcibly introduced into the corresponding part of the chamber 105, either by finger pressure or by the rear wall 102. The chamber 105 is configured and dimensioned in such a way that the lever 30 can be moved to and remains in a retracted position when the section 4b is properly accommodated in the chamber. FIG. 3 illustrates the lever 30 in extended or ejecting position. This ejecting position is selected in such a way that the operator can readily grasp the partially expelled magazine 4 in order to complete its extraction from the chamber 105.

FIG. 4 illustrates a portion of a third camera wherein the housing comprises a body 201 and a rear wall 202. The magazine 4 is shown in partially ejected position because the rear wall 202 is in open position. The reel of the takeup section 4a is still held between the bearing member 6 and the bearing member 7 (not shown). The ejector comprises one or more levers 12 (only one shown) pivotable on the bearing member 6 and/or 7 so that it is not necessary to provide a separate bearing or pivot for the lever or levers of the ejector. In other words, the pin 30a of FIG. 3 or the pins 8 of FIGS. 1 and 2 can be dispensed with; also, the arrangement of FIG. 4 occupies less room. The arm 12a of the lever 12 is biased by a helical spring 13 which is anchored in the body 201. A stop 14 is provided in the body 201 to arrest the lever 12 in fully extended position in which the arm 12b bears against the intermediate section 4c and holds the magazine 4 in partly ejected or expelled position. The numeral 203 denotes the film platform; the arm 12b of the lever 12 can be adjacent to or may extend into and through a suitable slot in this platform. In this embodiment of our invention, the arm 12b of the lever 12 engages the intermediate section 4c at a point which is closely adjacent to the section 4a. The chamber in the body 201 is shown at 205.

FIG. 5 shows a portion of a fourth camera housing having a first portion or body 301 provided with a chamber 305 for a magazine 4 and a second portion or rear wall 302 which is shown in closed position. The reel of the takeup section 4a is held between two bearing members (not shown) in the same way as in FIG. 1. The ejector comprises a lever 16 which is turnable on a pivot pin 16b mounted in that part (305a) of the chamber 305 which accommodates the takeup section 4a. The free end of the lever 16 has a platform 16c which is biased by a spring 17 installed in a recess 303a of the film platform 303 and which is also engaged by a projection 302e of the rear wall 302 when the latter is moved to closed position. The intermediate section 4c of the magazine 4 is then engaged by a resilient pressure plate 302p of the rear wall 302. The section 4a has a coupling member in the form of a tooth 4d which is automatically engaged by the tooth or pallet 18a of a complementary coupling member 18 here shown as a pawl which is turnable on the pivot pin 16b for the ejector lever 16. A leaf spring 19 biases the pawl 18 against the section 4a to maintain the pallet 18a in engagement with the coupling member 4d when the magazine 4 assumes the fully inserted position shown in FIG. 5. A motion transmitting lug 16a of the lever 16 then engages a protuberance 18b of the pawl 18. When the rear wall 302 is moved to open position, the spring 17 expands the causes the platform 16c of the lever 16 to effect partial ejection of the magazine 4 from the chamber 305, i.e., the magazine pivots about the axis of the reel in the section 4a. The spring 17 is stronger than the leaf spring 19; therefore, the lug 16a of the lever 16 can pivot the pawl 18 by way of the protuberance 18b so that the pallet 18a moves away from the coupling member 4d and allows manual extraction of the magazine 4 from the chamber 305 when the rear wall 302 is moved to open position. The pallet 18a automatically snaps behind the coupling member 4d of a freshly inserted magazine when the latter moves to the position shown in FIG. 5.

The heretofore described embodiments of our invention share the common feature that the ejector is not damaged when the magazine 4 is introduced into its chamber against the opposition of the springs 10, spring 30, spring 13 or spring 17. Furthermore, in each of these embodiments, the springs store energy when the magazine 4 is inserted into its chamber and when the rear wall of the housing assumes its closed position.

Figure 7:
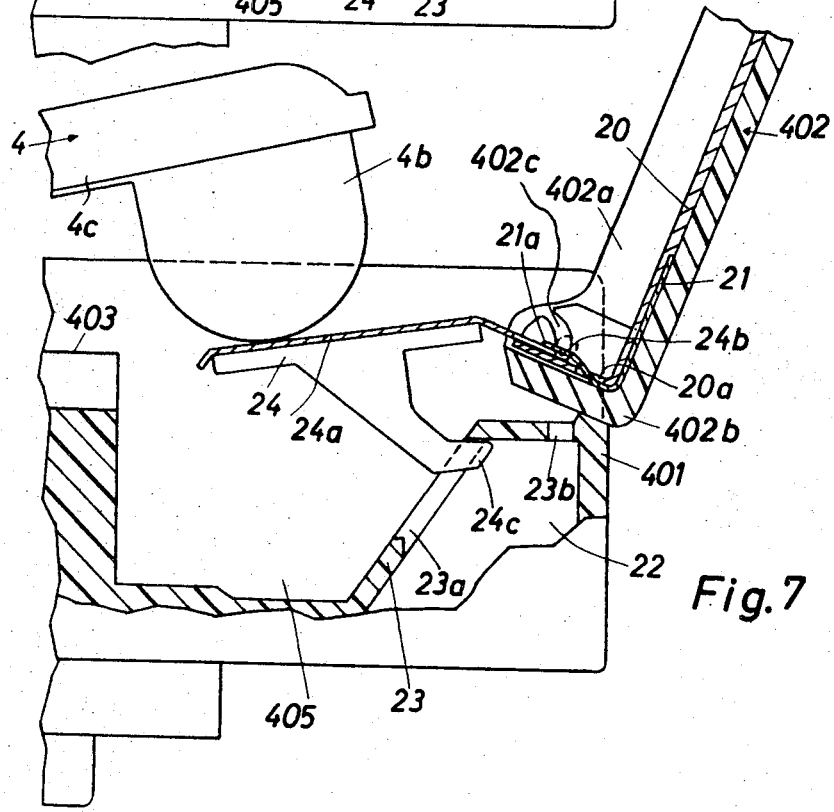
FIG. 7 illustrates the structure of FIG. 6, with the cover shown in open position.

Referring finally to FIGS. 6 to 8, there is shown a further still camera whose housing comprises a first portion or body 401 and a second portion 402 which constitutes a rear wall and is hingedly connected to the body 401. The latter defines a chamber 405 for the film magazine 4 and a compartment 22 which is separated from the chamber 405 by a partition 23 having a guide slot 23a for a protection 24c forming part of a lever 24 which in turn forms part of a modified ejector for the magazine 4. The rear wall 402 has a pair of forwardly extending flanges 402a (only one shown) provided with arcuate guide slots 402c adjacent to one corner 402b of the rear wall. The latter accommodates an insert 20 which clamps a first portion of a leaf spring 21 constituting a springy second component of the ejector. A second portion 21a of the leaf spring 21 extends through an opening 20a of the insert 20 toward the body 401. The aforementioned partition 23 is provided with a second aperture or slot 23b which is adjacent to the corner 402b. The lever 24 has a platform 24a which can engage the section 4b of the magazine 4 in order to move this section to the partially expelled position of FIG. 7 when the rear wall 402 is moved to open position. The platform 24a has an extension 24b whose lateral portions extend into and are guided by the slots 402c of the flange 402a on the rear wall 402. The extension 24b is adjacent to the second portion 21a of the leaf spring 21 and is urged by the portion 21a toward the closed ends of the guide slots 402c. The projection 24c is located centrally of the platform 24a and is guided by surfaces bounding the sides of the aperture 23a.

When the rear wall 402 is moved to the closed position shown FIG. 6, the second portion 21a of the leaf spring 21 urges the extension 24b of the platform 24a into the inner ends of the guide slots 402c. The portion 21a and the extension 24b thus form a pivot for the lever 24. At the same time, the portion 21a of the spring 21 biases the lever 24 in a counterclockwise direction so as to maintain the platform 24a out of contact with the fully inserted and confined magazine 4. The projection 24c of the lever 24 extends well into the interior of the compartment 22.

When the rear wall 402 is being moved to the open position shown in FIG. 7, the portion 21a of the leaf spring 21 continues to maintain the extension 24c in the inner ends of the guide slots 402c so that the lever 24 pivots with the rear wall in a clockwise direction and its platform 24a lifts the section 4b of the magazine 4 out of the chamber 405 to the position shown in FIG. 7. If the user wishes to insert a fresh magazine, the magazine of FIG. 7 is fully withdrawn by extracting its section 4a (not shown) from the space between the bearing members 6, 7 (see FIG. 1) and the fresh magazine is inserted into the chamber 405 in a manner as shown in FIG. 8. The rear wall 402 remains temporarily in open position so that the person manipulating the fresh magazine must overcome the bias of the leaf spring portion 21a by causing the extension 24b of the platform 24a to slide toward the open ends of the guide slots 402c. The tip of the projection 24c enters the second aperture 23b of the partition 23. Thus, insertion of a fresh magazine merely involves a minor effort which is necessary to flex the leaf spring 21 from the position of FIG. 7 to that shown in FIG. 8. The spring 21 is sufficiently flexible to readily stand such deformation so that the ejector is not damaged. If the rear wall 402 is thereupon returned to the closed position of FIG. 6, the portion 21a of the leaf spring 21 compels the extension 24b to reenter the inner ends of the guide slots 402c and the portion 21a ultimately moves the platform 24a slightly away from the section 4b of the freshly inserted magazine so that the lever 24 does not oppose the action of the pressure plate 402p which is mounted on the insert 20 and engages the magazine 4 in fully inserted position when the wall 402 is closed. The intermediate section 4c is then adjacent to the film platform 403.

If the user accidentally reinserts a partially ejected magazine 4, i.e., if the magazine shown in FIG. 7 is returned to the fully inserted position shown in FIG. 8, the rear wall 402 is simply moved first to closed and thereupon back to open position. This results in renewed partial ejection of the magazine.

It is further clear that the improved ejector is equally useful in cameras which comprise separate film supply and takeup cartridges or magazines. In such cameras, the housing accommodates two ejectors, one for each cartridge, or a single ejector for one of the two cartridges. Furthermore, the ejector is also useful in motion picture cameras for ejection or partial ejection of magazines which contain motion picture film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:
1. In a photographic camera, a combination comprising a housing having a first portion defining a chamber for reception of a film magazine and a second portion movable with reference to said first portion between closed and open positions in which it respectively confines and permits insertion or removal of a magazine from said chamber, said chamber being configured and dimensioned to accommodate magazines of the type having a rotary takeup member; springy ejector means having a lever extending into said chamber in the open position of said second portion to effect at least partial expulsion of a magazine from said chamber, said lever being pivotally mounted in said housing and said ejector means further comprising biasing means urging a portion of said lever against a magazine in said chamber; and bearing means rotatably supporting the takeup member of a magazine in said chamber, said bearing means further providing a pivot for said lever.

2. In a photographic camera, a combination comprising a housing having a first portion defining a chamber for reception of a film magazine and a second portion movable with reference to said first portion between closed and open positions in which it respectively confines and permits insertion or removal of a magazine from said chamber, said chamber being configured and dimensioned to accommodate magazines of the type having a coupling portion; springy ejector means having an element extending into said chamber in the open position of said second portion to effect at least partial expulsion of a magazine from said chamber; and spring-biased coupling means provided in said housing to engage said coupling portion on insertion of a magazine into said chamber, said ejector means further having means for disengaging said coupling means from said coupling portion of a magazine in said chamber in response to movement of said second portion to open position.

3. In a photographic camera, a combination comprising a housing having a first portion defining a chamber for reception of a film magazine and a second portion movable with reference to said first portion between closed and open positions in which it respectively confines and permits insertion or removal of a magazine from said chamber, said first portion further defining a compartment and comprising a partition separating said compartment from said chamber, said partition having at least one aperture; and springy ejector means having an element extending into said chamber in the open position of said second portion to effect at least partial expulsion of a magazine from said chamber, said element comprising a lever which is pivoted to said second portion and extends into said chamber so as to be displaced from an ejecting position to a retracted position in response to forcible insertion of a magazine into said chamber, said lever having a projection which extends into and is guided by said aperture to enter said compartment in response to movement of said lever to retracted position, said lever further comprising an extension and said second portion comprising a guide slot pivotably and slidably accommodating said extension, said ejector means further comprising resilient means mounted on said second portion and operative to bias said extension in response to movement of said second portion to open position to thereby move said lever to extended position.

4. A combination as defined in claim 3, wherein said resilient means comprises a spring which maintains said lever in retracted position in closed position of said second portion.

5. In a photographic camera, a combination comprising a housing having a first portion defining a chamber for reception of a film magazine and a second portion movable with reference to said first portion between closed and open positions in which it respectively confines and permits insertion or removal of a magazine from said chamber, said first portion having an aperture in communication with said chamber; and ejector means including a lever having a projection which is received and guided in said aperture, and pivot means articulately connecting said lever only to the second portion of said housing, said lever being arranged to assume—in response to movement of said second portion to open position—an ejecting position in which it effects at least partial expulsion of a magazine from said chamber and being movable from such ejecting position to a retracted position in response to forcible insertion of a magazine into said chamber in the open position of said second portion, said pivot means comprising resilient means arranged to oppose the movement of said lever to retracted position in the open position of said second portion.

6. A combination as defined in claim 5, wherein said pivot means is provided with a guide slot and wherein said lever further comprises an extension which is pivotably and slidably received in said slot.

7. A combination as defined in claim 5, wherein said lever is arranged to move to said ejecting position in response to movement of said second portion from an intermediate position toward said open position.

8. A combination as defined in claim 7, wherein said second portion of said housing is arranged to pivot the lever to said ejecting position by way of said resilient means.

9. A combination as defined in claim 5, wherein said resilient means is arranged to disengage said lever from a magazine in said chamber in response to movement of said second portion to closed position.